United States Patent Office 3,173,941
Patented Mar. 16, 1965

3,173,941
METHOD OF PRODUCING 2,2-LOWER ALKYL-SUBSTITUTED - 1,3 - PROPANEDIOL DICARBAMATES
Joseph Levy, Paramus, N.J., and Alvin Friedman, Flushing, N.Y., assignors, by mesne assignments, to Universal Oil Products Company, Des Plaines, Ill., a corporation of Delaware
No Drawing. Filed June 28, 1961, Ser. No. 120,194
3 Claims. (Cl. 260—482)

This invention relates to improved methods for the production of 2,2-lower alkyl-substituted-1,3-propanediol dicarbamates. This application is a continuation-in-part of application Serial No. 828,700, filed July 22, 1959, now abandoned.

2,2 - lower alkyl-substituted - 1,3 - propanediol dicarbamates are widely used as tranquillizing agents and have heretofore been produced by an ester-exchange method. In this procedure, the propanediol is reacted with a carbamate of a lower molecular weight alcohol in the presence of a catalyst such as an aluminum alkoxide. However, in employing this method, it is necessary to remove the lower alcohol liberated upon formation of the desired carbamate in order to drive the reaction to completion.

It has been suggested heretofore that removal of the alcohol from the reaction mixture be accomplished by employing an inert diluent as an azeotroping agent or by carrying out the process in the absence of a diluent under reduced pressure. The latter procedure, of course, has the advantage of permitting a much greater charge to be utilized for a given reaction vessel. However, it has been considered essential when conducting the process at subatmospheric pressure that the mixture be kept boiling vigorously and the reaction be conducted at relatively elevated temperatures of about 140° to 180° C. while progressively reducing the pressure from an initial pressure of about 250 mm. to a final pressure of about 15 to 20 mm. in order to completely remove the alcohol produced. By thus maintaining a substantially constant temperature within the specified operating range and gradually reducing the pressure, the alcohol evolved is distilled off rapidly as it is formed. However, under such conditions difficulties are often encountered in that the alkyl carbamate also tends to distill over. Moreover, the yields obtained are only about 50 to 60% of theory and the product does not have the highest purity.

It has now been discovered that much higher yields can be obtained and the product will have greater purity if the reaction is carried out at reduced pressures but at a lower range of temperatures than previously suggested and under different operating conditions which assure the distillation and removal of the alcohol produced from the reaction mixture but which do not cause substantial amounts of the alkyl carbamate to distill out during the course of the reaction.

The advantages of the present invention may be attained by heating the reactants together in the absence of an extraneous solvent or diluent at reduced pressures and at relatively low temperatures. Thus, the temperature of the reaction is preferably maintained within the limits of about 100° C. to 140° C. and the pressure is maintained between about 50 to 150 mm. of mercury. Furthermore, in contrast to the methods previously suggested, the pressure is maintaied substantially constant while progressively increasing the temperature within the prescribed operating range as the reaction proceeds. In this way, the yield may be increased by as much as 25 to 30% while products having a higher purity are obtained.

Accordingly, the principal object of the present invention is to provide improved methods for the production of 2,2 - lower alkyl-substituted - 1,3 - propanediol dicarbamates wherein the alcohol produced is removed by operating at subatmospheric pressures and no diluent is required.

A further object of the invention is to increase the yield and purity of 2,2-lower alkyl-substituted-1,3-propanediol dicarbamates obtained by an ester-exchange method.

A specific object of the invention is to provide an ester-exchange method for producing 2,2-lower alkyl-substituted-1,3-propanediol dicarbamates wherein the reaction is conducted at temperatures below about 140° C. and in the absence of a solvent or diluent at subatmospheric pressures.

These and other objects and features of the present invention will appear from the following description thereof wherein typical procedures are cited by way of example and for the purpose of indicating the nature of the present invention but without intending to limit the scope of the invention thereby.

In carrying out the process in accordance with the present invention, 2,2-lower alkyl-substituted-1,3-propanediol is reacted with a lower molecular weight alcohol carbamate in the presence of a catalyst such as an aluminum alkoxide. The diol and lower carbamate may be employed in stoichiometric amounts but the lower carbamate may also be used in excess up to about two to three times the theoretical amount required if desired. Ordinarily, it is preferred to use about 30% excess of the lower carbamate in order to obtain the maximum yield.

The temperature at which the reaction is carried out is preferably varied within the range of from about 100° C. to 140° C., whereas the pressure is preferably maintained substantially constant during the reaction and between about 50–150 mm. of mercury. The pressure at which the reaction is carried out may, if desired, be less than 50 mm. of mercury, although it should be maintained sufficiently high to prevent distillation of substantial amounts of the lower carbamate employed from the reaction mixture. After the reaction has been completed and the evolution of the alcohol produced has substantially ceased, the catalyst is killed by the addition of water before lowering the pressure further or raising the temperature to distill off any alkyl carbamate remaining in the reaction mixture for reuse.

In order to illustrate typical procedure which may be employed in the practice of the present invention, the following examples are cited.

*Example I*

2640 g. 2-methyl-2-n-propyl-1,3-propanediol, 4680 g. ethyl carbamate and 144 g. aluminum isopropylate were heated with stirring under a substantially constant pressure of about 100 mm. Reaction commenced at about 110° C. with distillation of ethanol. Heating was continued for about eight hours during which time the reaction temperature of the mixture was gradually raised to about 138° C. while a total of 1832 g. (about theory) of ethanol was obtained as a distillate. The completion of the reaction was also noted by a rapid drop in the rate of ethanol distillation. The reaction was then terminated by adding 72 g. water in order to destroy the catalyst, and the unreacted ethyl carbamate removed by distillation in vacuo at about 5 mm. pressure. There was recovered for reuse 1125 g. of ethyl carbamate (solidification point=47.7° C.) distilling at 80–90° C. at about 5 mm. Crystallization of the material remaining in the reaction pot from about 2 parts of a 30% methanol-water mixture gave 3690 g. (84.5% of theory) of 2-methyl-2-n-propyl-1,3-propanediol dicarbamate in a high state of purity (M.P.=105–6° C.).

Example II 132 g. 2-methyl-2-n-propyl-1,3-propanediol, 234 g. ethyl carbamate and 7.2 g. aluminum isopropylate were heated under a substantially constant pressure of about 50 mm. for about six and one-half hours. During this time the temperature was gradually raised from about 104° to about 135° C. and a total of 98 gms. ethanol was collected as a distillate. The reaction was terminated by the addition of 3.6 g. water and the unreacted ethyl carbamate removed by distillation in vacuo at about 5 mm. of pressure. There was collected 48 g. ethyl carbamate suitable for reuse (solidification point=47.8° C.). Crystallization of the residual material in the reaction pot from a 30% methanol-water-mixture gave 185 g. (85% yield) of the desired 2-methyl-2-n-propyl-1,3-propanediol dicarbamate in a high state of purity (M.P.=105.6–106.6° C.).

Example III 66. g. 2-methyl-2-n-propyl-1,3-propanediol, 100 g. methyl carbamate, and 3.6 g. aluminum isopropylate were heated under a substantially constant pressure of about 75 mm. for about five hours during which time the temperature was gradually raised from about 104° to 138° and 35.3 g. methyl alcohol was collected as a distillate. The reaction was then terminated by the addition of 1.8 g. water and 19.6 g. unreacted methyl carbamate were recovered for reuse by distillation at about 5 mm. pressure. Crystallization of the residual material from about a 30% methanol-water mixture gave 91.8 g. (84.3% yield) of the desired dicarbamate in a high state of purity (M.P.=105.2–106.2° C.).

Example IV 146 g. of 2-methyl-2-sec. butyl-1,3-propanediol were mixed with 356 g. of ethyl carbamate. 14.6 g. of aluminum isopropylate were added to the mixture and the temperature raised to 100° C. The pressure was reduced to 100 mm. and the reaction carried on for a period of two and one-half hours while raising the temperature to 137° C. 102 g. of ethanol distilled off from the reaction mixture. The mixture was then cooled to 100° C. and 8 g. of water were added to destroy the catalyst. The excess ethyl carbamate remaining was distilled off at a pressure of 5 mm. whereby 165 g. of ethyl carbamate were recovered. 200 g. of isopropanol were added to the mixture and it was then filtered to remove the aluminum hydroxide. 730 g. of water were added at 50° C. and the mixture cooled to 20° C. whereupon the product separated and crystallized. It was further cooled to 5° C. and washed with isopropanel whereby 202 g. of 2-methyl-2 sec. butyl-1,3-propanediol carbamate were obtained having a purity of 97.5% and representing a yield of 87.3% of theory.

In carrying out the process of the present invention the pressure is generally maintained constant, whereas the temperature is raised as the reaction proceeds. The initial temperature is preferably about 100° C. to 110° C. whereas the final temperature generally need not exceed 140° C. The catalyst is killed by the addition of water to the reaction mixture before the alkyl carbamate remaining is distilled off for reuse.

It will thus be apparent that the methods of the present invention are capable of variations within the limits indicated whereby it is possible to produce various 2,2-lower alkyl-substituted-1,3-propanediol dicarbamates in a manner to obtain high yield while limiting the cost of the reaction and permitting the recovery and reuse of the excess lower carbamate employed in the process. It should, therefore, be understood that the examples cited are intended to be illustrative only and are not intended to limit the scope of the invention.

We claim:

1. In a method of producing a 2,2-lower alkyl-substituted-1,3-propanediol dicarbamate by reacting a 2,2-lower alkyl-substituted-1,3-propanediol with an alkyl carbamate containing an alkyl group of lower molecular weight by heating the reactants at a temperature below 170° C. under subatmospheric pressure in the presence of an aluminum alkoxide catalyst and in the absence of a solvent while distilling from the reaction mixture a lower molecular weight alcohol produced as the reaction proceeds, the improvement which comprises obtaining a yield of said dicarbamate in excess of 75% of the theoretical by carrying out the reaction at a temperature of about 100° C. to 140° C. and at a pressure of about 50 to 150 mm. of mercury, said pressure being maintained substantially constant throughout said reaction and said temperature being gradually increased through said range of about 100° C. to 140° C. during said reaction.

2. The process of claim 1 wherein said propanediol is 2-methyl-2-n-propyl-1,3-propanediol, said carbamate is ethyl carbamate and said dicarbamate produced is 2-methyl-2-n-propyl-1,3-propanediol dicarbamate.

3. The process of claim 1 wherein said propanediol is 2-methyl-2-sec. butyl-1,3-propanediol, said carbamate is ethyl carbamate and said dicarbamate produced is 2-methyl-2-sec. butyl-1,3-propanediol dicarbamate.

References Cited in the file of this patent

UNITED STATES PATENTS

| 2,878,280 | Berger et al. | Mar. 17, 1959 |
| 2,934,559 | Beinfest et al. | Apr. 26, 1960 |